US008230233B2

(12) United States Patent
Yoneda

(10) Patent No.: US 8,230,233 B2
(45) Date of Patent: Jul. 24, 2012

(54) INFORMATION PROCESSING TERMINAL AND PROGRAM FOR USE THEREWITH

(75) Inventor: Atsuo Yoneda, Kanagawa (JP)

(73) Assignee: Felica Networks, Inc., Tokyo (JP)

( * ) Notice: Subject to any disclaimer, the term of this patent is extended or adjusted under 35 U.S.C. 154(b) by 1040 days.

(21) Appl. No.: 11/758,146

(22) Filed: Jun. 5, 2007

(65) Prior Publication Data

US 2008/0022123 A1 Jan. 24, 2008

(30) Foreign Application Priority Data

Jun. 5, 2006 (JP) ................................ P2006-155960

(51) Int. Cl.
*G06F 9/46* (2006.01)
*G06F 12/14* (2006.01)
(52) U.S. Cl. .......................... 713/189; 718/102; 718/105
(58) Field of Classification Search ........................ None
See application file for complete search history.

(56) References Cited

U.S. PATENT DOCUMENTS

| 3,631,405 | A | * | 12/1971 | Hoff et al. ...................... 712/209 |
|---|---|---|---|---|
| 5,758,069 | A | * | 5/1998 | Olsen .............................. 726/27 |
| 6,061,726 | A | * | 5/2000 | Cook et al. ...................... 709/226 |
| 7,340,553 | B2 | * | 3/2008 | Gelke et al. ..................... 710/310 |
| 2004/0157134 | A1 | * | 8/2004 | Kim et al. ........................ 430/5 |
| 2007/0045425 | A1 | * | 3/2007 | Yoshida et al. ............... 235/492 |
| 2007/0101122 | A1 | * | 5/2007 | Guo ............................... 713/153 |
| 2008/0090603 | A1 | | 4/2008 | Breitfuss et al. | |

FOREIGN PATENT DOCUMENTS

| JP | 2006-053874 | 2/2000 |
|---|---|---|
| JP | 2000-194799 | 7/2000 |
| JP | 2002-150250 | 5/2002 |
| JP | 2002-222442 | 8/2002 |
| JP | 2004-046408 | 2/2004 |
| JP | 2004-145605 | 5/2004 |
| JP | 2004-288080 | 10/2004 |
| JP | 3617509 | 11/2004 |
| JP | 2004-341634 | 12/2004 |
| JP | 2005-128746 | 5/2005 |
| JP | 2006-343997 | 12/2006 |
| JP | 2007-535059 | 11/2007 |
| WO | WO 2007010333 A1 * | 1/2007 |

OTHER PUBLICATIONS

Chaumette S et al. "Secure Distributed Computing on a Java Card #8482; Grid", Parallel and Distributed Processing Symposium, 2005.*

* cited by examiner

*Primary Examiner* — Matthew Henning
(74) *Attorney, Agent, or Firm* — Finnegan, Henderson, Farabow, Garrett & Dunner, L.L.P.

(57) ABSTRACT

An information processing terminal includes: a first IC card chip constituted by a first control unit, a first storage unit configured to store applications to be processed by the first control unit, a first encryption unit configured to encrypt data created by any of the applications in the first storage unit before outputting the created data outside the chip, and a wireless control unit configured to permit noncontact wireless communication with a reader/writer; a second IC card chip constituted by a second control unit, a second storage unit configured to store applications to be processed by the second control unit, and a second encryption unit configured to encrypt data created by any of the applications in the second storage unit before outputting the created data outside the chip; and a terminal control unit configured to control data communication between the first IC card chip and the second IC card chip.

9 Claims, 9 Drawing Sheets

F I G . 1
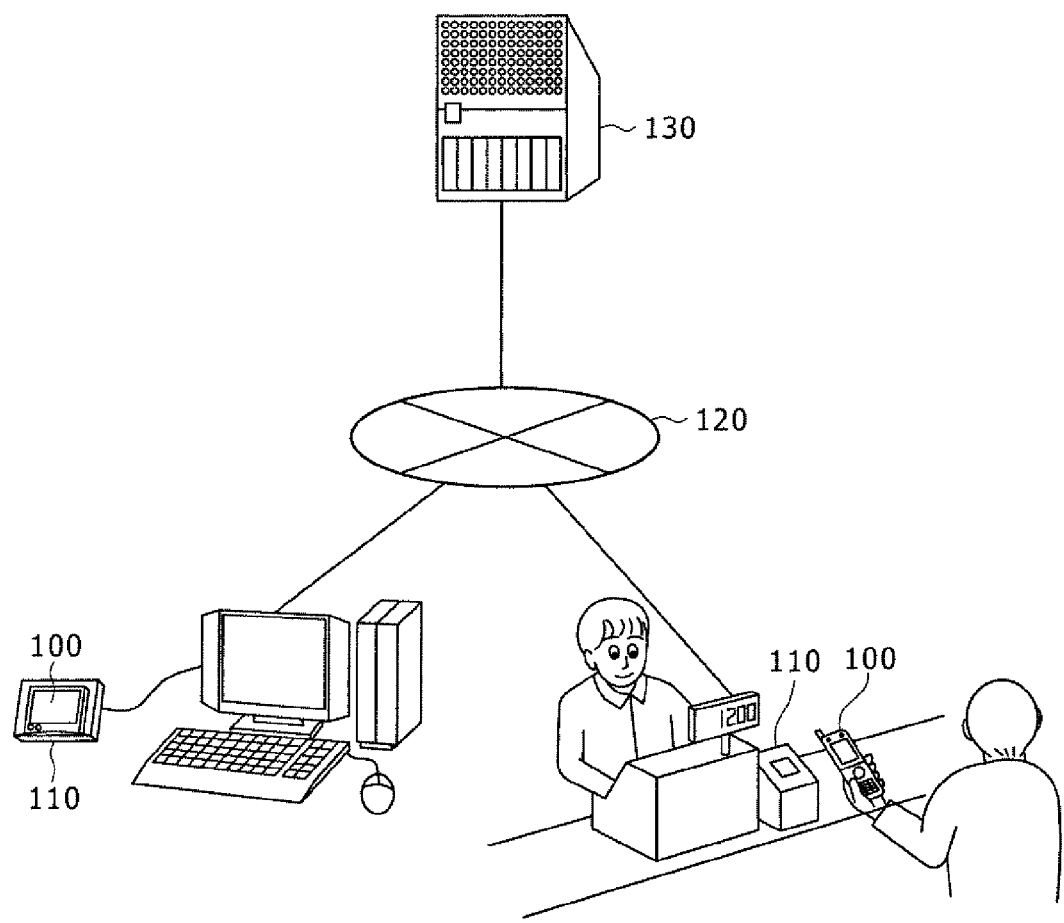

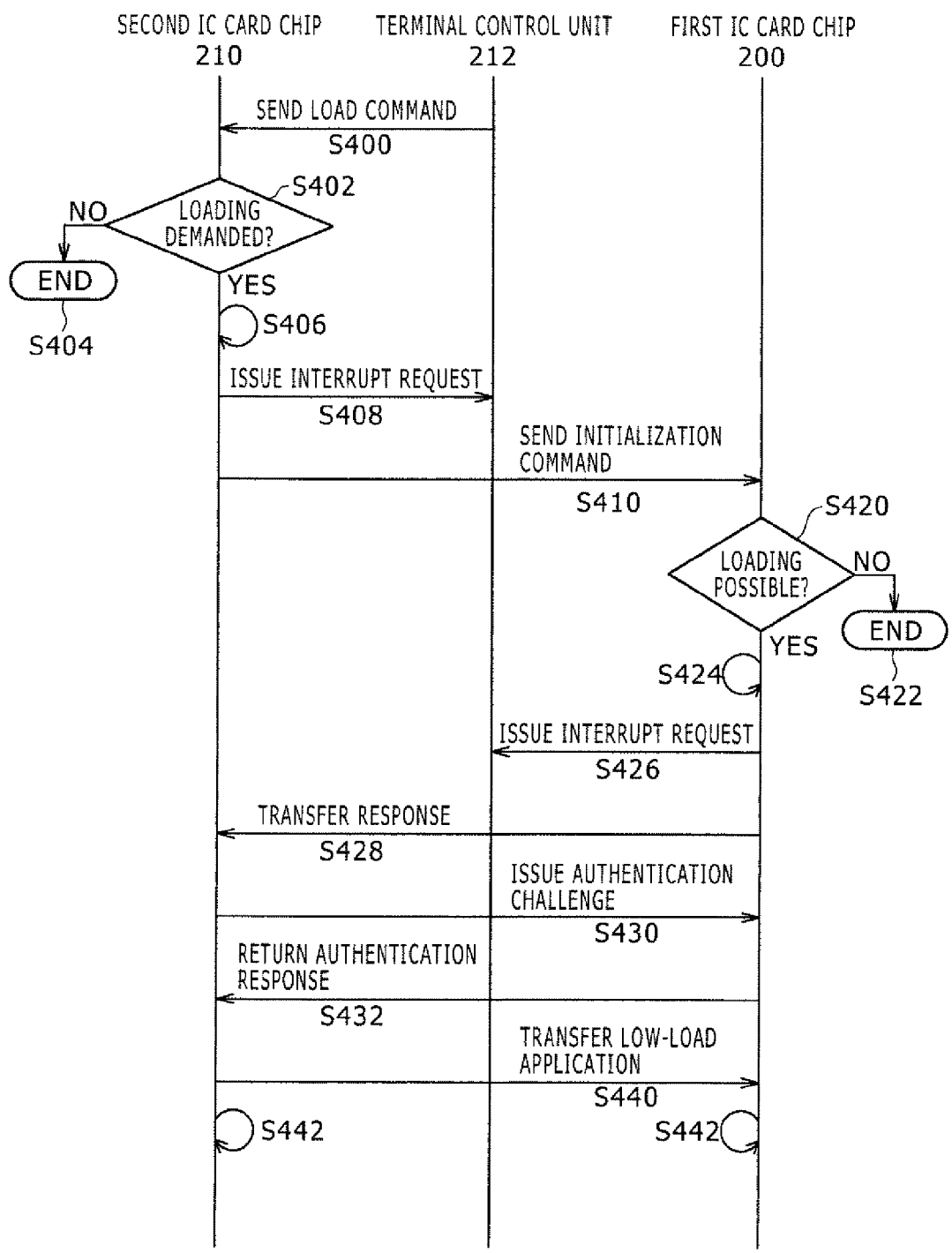

F I G. 5 A

CONTENTS OF THE SECOND MEMORY MANAGEMENT UNIT 274

| APPLICATION INFORMATION | CHIP ID | LOAD-COMPLETE FLAG |
|---|---|---|
| APPLICATION A | 1 | CLEARED |
| APPLICATION B | — | SET |
| APPLICATION C | 1 | CLEARED |
| APPLICATION D | — | SET |

CONTENTS OF THE FIRST MEMORY MANAGEMENT UNIT 254

| APPLICATION INFORMATION | LOAD-COMPLETE FLAG |
|---|---|
| — | CLEARED |
| — | CLEARED |
| — | CLEARED |
| — | CLEARED |

F I G. 5 B

CONTENTS OF THE SECOND MEMORY MANAGEMENT UNIT 274

| APPLICATION INFORMATION | CHIP ID | LOAD-COMPLETE FLAG |
|---|---|---|
| APPLICATION A | 1 | SET |
| APPLICATION B | — | SET |
| APPLICATION C | 1 | SET |
| APPLICATION D | — | SET |

CONTENTS OF THE FIRST MEMORY MANAGEMENT UNIT 254

| APPLICATION INFORMATION | LOAD-COMPLETE FLAG |
|---|---|
| APPLICATION A | SET |
| APPLICATION C | SET |
| — | CLEARED |
| — | CLEARED |

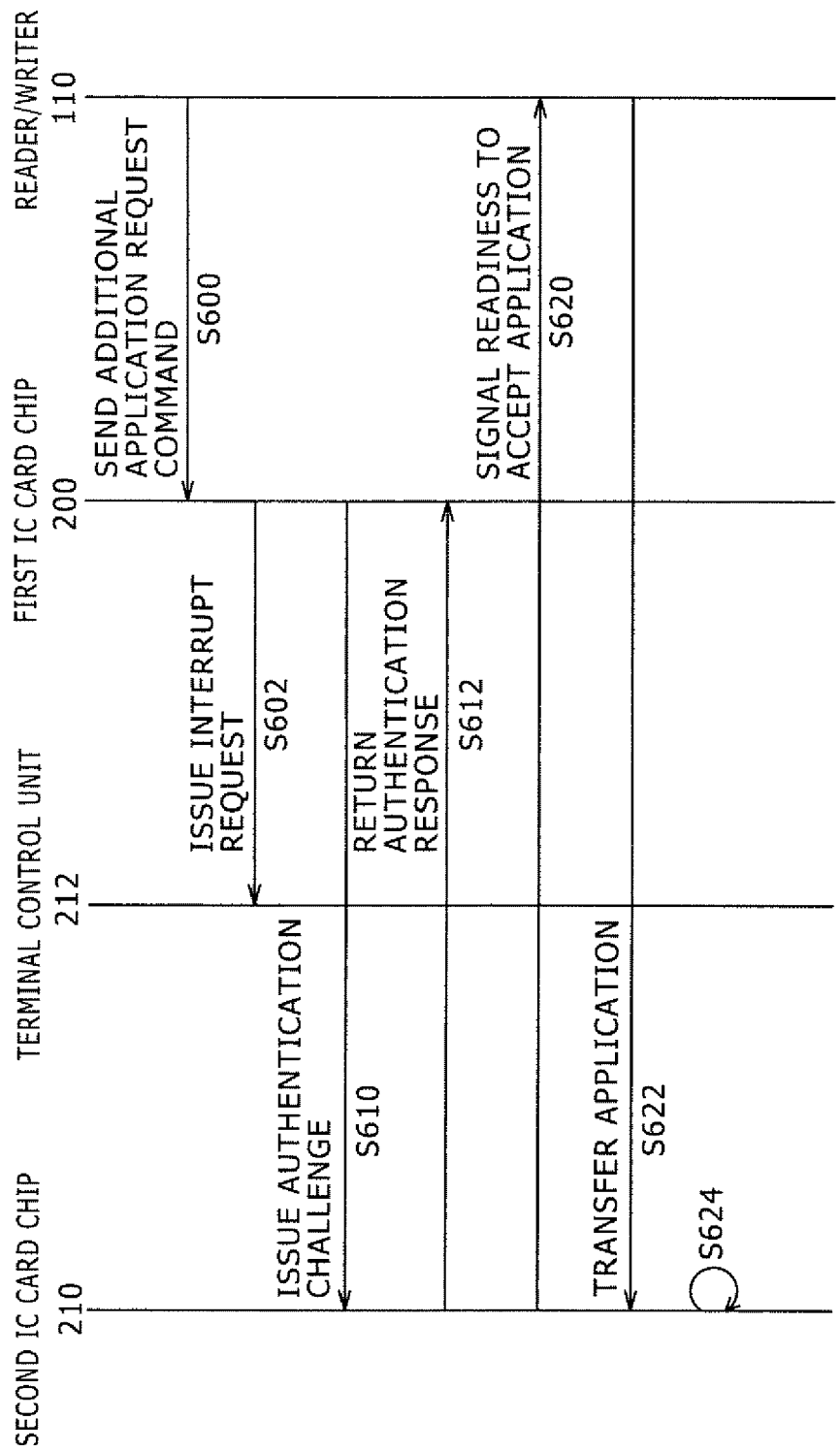

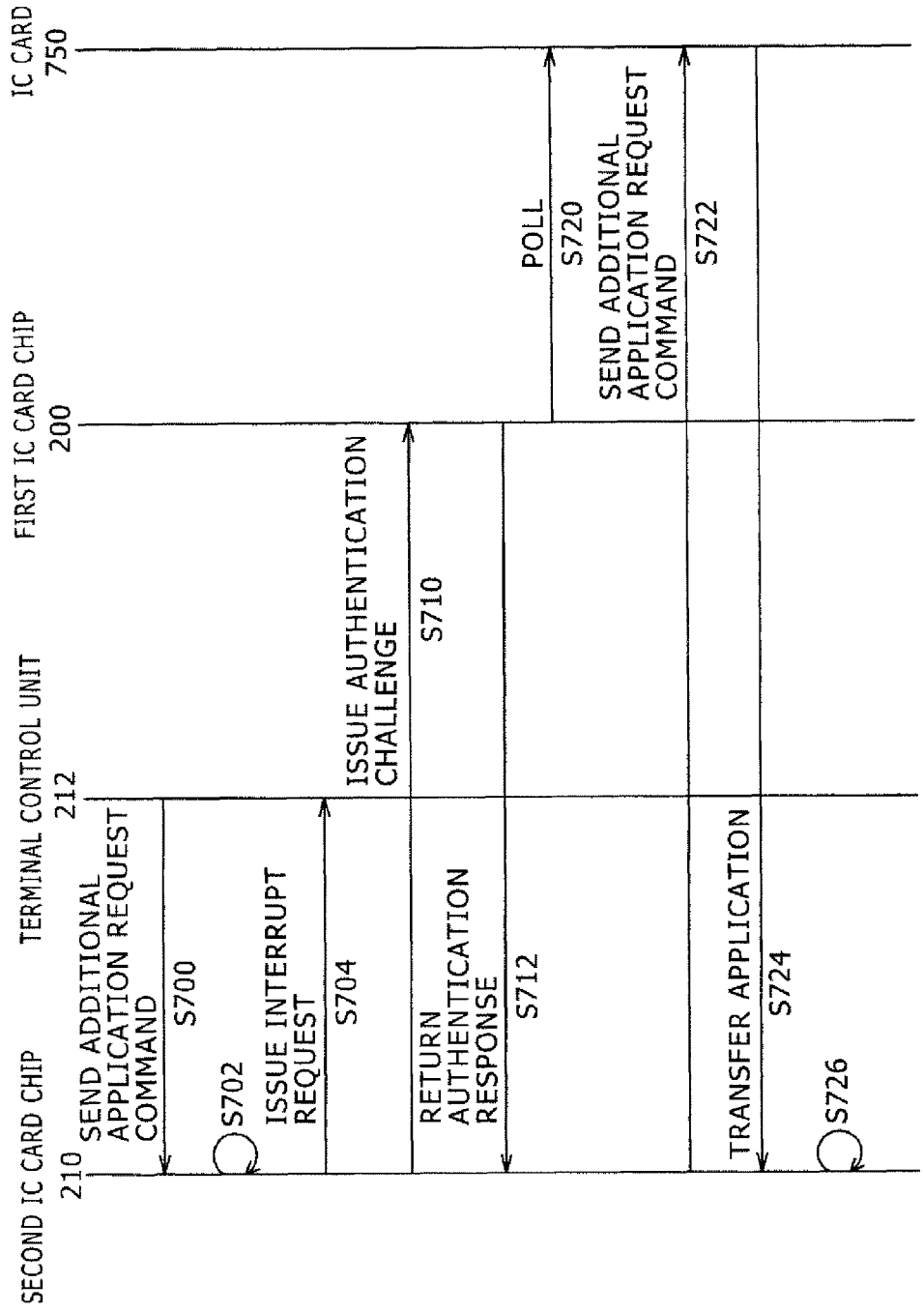

INFORMATION PROCESSING TERMINAL AND PROGRAM FOR USE THEREWITH

CROSS REFERENCE TO RELATED APPLICATIONS

The present invention contains subject matter related to Japan Patent Application JP 2006-155960 filed with the Japan Patent Office on Jun. 5, 2006, the entire contents of which being incorporated herein by reference.

BACKGROUND OF THE INVENTION

1. Field of the Invention

The present invention relates to an information processing terminal capable of noncontact wireless communication and a program for use with the terminal.

2. Description of the Related Art

Recent years have seen growing acceptance of IC tags and IC cards capable of noncontact wireless communication and information processing terminals such as mobile phones equipped with such an IC card each. The IC tag is typically embedded in the price tag of a product to indicate its price when scanned electronically. The IC card is illustratively arranged to store electronic money information for use in making payments. In a new development, IC card capabilities have been put into an IC card chip that is added to information processing terminal equipment. In this case, the balance of the electronic money in the IC card can be checked by way of the information processing terminal.

The information processing terminal in related art provided with the IC card function has a dual data processing arrangement: a terminal control unit (external CPU) for performing arithmetic operation specific to the terminal, and an IC card control unit for carrying out operations unique to the IC card capability. The two data processing sections execute their own applications without interfering with each other's data domain. If the IC card control unit may not keep up with its operations, part or all of the operations may be delegated to the terminal control unit for execution (e.g., see Japanese Patent Laid-open No. 2006-053874).

Still, it is preferred that the IC card control unit operate independently of the terminal control unit in order to maintain the reliability of the IC card. In view of possible functional expansion in the future, the IC card control unit built as an independent circuit typically has to adopt a high-performance CPU and a large-capacity memory.

As a result, even upon execution of such simple applications as data exchanges with a reader/writer (e.g., for checks on internal data of the card), it is necessary typical to start up and operate the high-performance IC card control unit. It has been difficult to reduce the amount of power consumed when the ponderous IC card function is activated. Although there have been proposed techniques for preparing a plurality of power supplies with different voltages aimed at lowering wasteful power consumption (e.g., see Japanese Patent Laid-open No. 2002-150250 and Japanese Patent No. 3617509), effective methods have yet to be disclosed for drastic reductions in power consumption of the IC card function.

SUMMARY OF THE INVENTION

Where information processing terminals of the above-mentioned type need to have their IC card function expanded on a hardware basis, the currently mounted IC card chip has to be removed and discarded along with its still-usable internal circuits for wireless communication with the reader/writer. The replacement of such IC card chips has thus been costly.

As one way to facilitate the chip replacement procedure, noncontact IC card capabilities may be mounted on such removable media as SIM (Subscriber Identity Module)/UIM (User Identity Module) cards. This, however, involves having recourse to media-specific interfaces that are slow to start up and run and can hamper smooth execution of certain applications.

The present invention has been made in view of the above circumstances and provides an innovative information processing terminal and a program for use therewith, the terminal and program being improved to permit data communication reliably between the terminal and a reader/write by carrying out arithmetic operations optimally applicable to the processing load involved in utilizing a given application.

Basically, the inventive information processing terminal inserted art has a plurality of IC card chips installed to deal with the IC card capabilities performed by a single IC card chip, each of the chips carrying out suitably assigned applications independently.

In carrying out the present invention and according to an embodiment, there is provided an information processing terminal including: a first IC card chip, a second IC card chip, and a terminal control unit. The first IC card chip is constituted by a first control unit, a first storage unit configured to store applications to be processed by the first control unit, a first encryption unit configured to encrypt data created by any of the applications in the first storage unit before outputting the created data outside the chip, and a wireless control unit configured to permit noncontact wireless communication with a reader/writer. The second IC card chip is constituted by a second control unit, a second storage unit configured to store applications to be processed by the second control unit, and a second encryption unit configured to encrypt data created by any of the applications in the second storage unit before outputting the created data outside the chip. The terminal control unit is configured to control data communication between the first IC card chip and the second IC cared chip.

The first and the second encryption units serve to permit secure communication among the reader/writer, first IC card chip, and second IC card chip in the manner independent of the terminal control unit. This makes it possible to provide highly reliable communication channels between a plurality of IC card chips, the level of security being as high as with a single IC card chip.

Because the terminal control unit controls data communication between the first and the second IC card chips, the first and the second control units can concentrate on the processing of the applications that have been selected. This helps shorten overall processing time.

Preferably, any of the applications may be processed by either the first IC card chip or by the second IC card chip in accordance with a processing load involved in data communication with the reader/writer.

The first and the second control units may be assigned different processing capabilities. The two control units may each take over execution of one of a plurality of applications in accordance with the processing load of the application in question. That means power-saving control may be affected by the control for each application to be executed. The provider of a given application can specify which of the processing circuits should be activated to handle the application in view of the processing load involved (e.g., one application may be allowed to run slowly for undergoing ponderous processes; another application may need to be carried out as quickly as possible regardless). This arrangement allows arithmetic processing to be carried out optimally in accordance with the processing load of the application to be utilized.

Preferably, the first control unit may be capable of singly executing low-load applications of which the processing load is less than a predetermined level, without intervention of the second IC card chip and the terminal control unit.

Applications may be divided into two categories above and below a predetermined threshold level of processing load. The first control unit is composed of components at least capable of handling the applications of which the processing load is below the threshold level. Because it need only execute such low-load applications, the first control unit can be a fast, power-thrifty control unit. Even when the amount of supplied power is small, the first control unit can start up and execute a low-load application.

The wireless control unit is furnished in the first IC card chip. That means the first IC card chip need only be activated from its sleep state to establish data communication with the reader/writer in a short item, with no intervention of the second control unit or terminal control unit. At a time when applications are diversifying in type and their levels of sophistication are rising, the information processing terminal arranged to effect instantaneous processing can shorten the time it takes to process various applications.

Preferably, the first IC card chip may be capable of singly executing the low-load applications using energy derived from radio waves received from the reader/writer.

With the preferred structure above in use, even if the information processing terminal itself is not switched on, the first IC card chip may receive infinitesimal power from an external apparatus such as the reader/writer to carry out a low-load application. Because it can effect data communicating with a minimum amount of power (on low voltage), the first IC card chip can continue sending and receiving data stably under unstable circumstances where the supply of a certify level of power is difficult to maintain.

Preferably, low-load applications may be loaded from the second storage unit into the first storage unit in accordance with a load command issued by the terminal control unit. Alternatively, the low-load applications may be saved from the first storage unit into the second storage unit in accordance with a save command issued by the terminal control unit.

Where the preferred structure above is in use, the applications to be referenced by each IC card chip may be loaded or saved collectively between the two storage units.

Preferably, each of the low-load applications in the second storage unit may not be deleted but disabled by setting a load-complete flag when the low-load application in question is loaded, the low-load application being again enabled by clearing the load-complete flag when the low-load application is saved.

With the above structure in use, the low-load applications may apparently be loaded from the second storage unit into the first storage unit or saved from the first storage unit into the second storage unit without actual movement of data. Because of the absence of actual data communication, the processing time may be shortened and power consumption reduced.

Preferably, the second IC card chip may be detachable from the information processing terminal. Illustratively, the second IC card chip may be one of removable media such as SIM/UIM cards.

The preferred structure above allows the IC card chip to be replaced easily in the event of hardware modifications such as one for expanding encryption capabilities. The IC card function may thus be expanded or reduced in scale depending on the desired mode of use. The fact that the second IC card chip is easy to replace eliminated the need for initially adopting a sophisticated IC card chip containing a high-performance control unit and a large-capacity storage unit anticipating future usages. This helps reduce the area for hardware implementing and result in cost savings.

With the second IC card chip arranged to be detachable, it is possible to move from one information processing terminal to another the IC card chip together with the applications contained in its second storage unit. It is also possible for the user to carry around the second IC card chip as a storage medium. Another possibility is the offering of services such as provision of a second IC card chip with applications pre-installed inside.

Preferably, the terminal control unit may save low-load applications from the first storage unit into the second storage unit when the second IC card chip is detached from the information processing terminal, the terminal control unit further loading the low-load applications from the second storage unit into the first storage unit after the second IC card chip has been attached to the information processing terminal.

Where the preferred structure above is in effect, all applications stored in the first and the second storage units may be saved into the second IC card chip for collective export to another terminal. These applications may then be used unchanged on the new terminal. It follows that when the user replaces the existing information processing terminal with another terminal, the applications utilized so far may be easily moved into the chip and exported to the new terminal without complicated exporting procedures or steps.

The second IC card chip has no wireless control unit acting as an interface with the reader/writer. That means the encryption function may be expanded or applications may be changed with no need to modify the currently mounted first IC card chip.

Preferably, the applications to be processed either by the first IC card chip or by the second IC card chip may be either added to or deleted from any of the first storage unit and the second storage unit through the wireless control unit.

Information processing terminals are generally subject to diverse modes of communication, so that their data input interfaces may or may not be structured securely. In such cases, it is possible to keep the applications to be handled by the first or the second IC card chip above a certain level of reliability when they are added or deleted through the wireless control unit having established secure communication channels with the reader/writer.

Preferably, the information processing terminal may be formed integrally with the reader/writer. In this setup, the first IC card chip may output a carrier wave by means of a suitable function of the reader/writer or may receive a carrier wave through the use of an appropriate IC card function.

According to another embodiment of the present invention, there is provided a program for use with an information processing terminal including: a first IC card chip, a second IC card chip, and a terminal control unit. The first IC card chip is constituted by a first control unit, a first storage unit configured to store applications to be processed by the first control unit, a first encryption unit configured to encrypt data created by any of the applications in the first storage unit before outputting the created data outside the chip, and a wireless control unit configured to permit noncontact wireless communication with a reader/writer. The second IC card chip is constituted by a second control unit, a second storage unit configured to store applications to be processed by the second control unit, and a second encryption unit configured to encrypt data created by any of the applications in the second storage unit before outputting the created data outside the chip. The terminal control unit is configured to control data communication between the first IC card chip and the second IC card chip. If any of the applications stored in the first storage unit is selected, then the program causes the first control unit singly to perform data communication with the reader/writer through the wireless control unit without intervention of the second IC card chip and the terminal control unit. If any of the applications stored in the second storage unit is selected, then the program causes the second control unit to perform data communication with the reader/writer through the first control unit.

Where the present invention is implemented as outlined above, the IC card capabilities of the information processing terminal are divided into at least two control units inside, each control unit carrying out applications in a manner commensurate with its performance. This structure helps execute data communication advantageously between the reader/writer and the information processing terminal.

BRIEF DESCRIPTION OF THE DRAWINGS

FIG. 1 is a schematic view explanatory of a data communication system including an information processing terminal of an embodiment of the present invention;

FIG. 4 is a flowchart of steps showing the flow of initialization of the information proceeding terminal;

FIGS. 5A and 5B are diagrams explanatory of the contents of a second and a first memory management unit;

FIG. 8 is a flowchart of steps in which applications are typically added or deleted in the information processing terminal; and FIG. 9 is another flowchart of other steps in which applications are typically added or deleted in the information processing terminal.

DETAILED DESCRIPTION OF THE PREFERRED EMBODIMENTS

Figure 2:
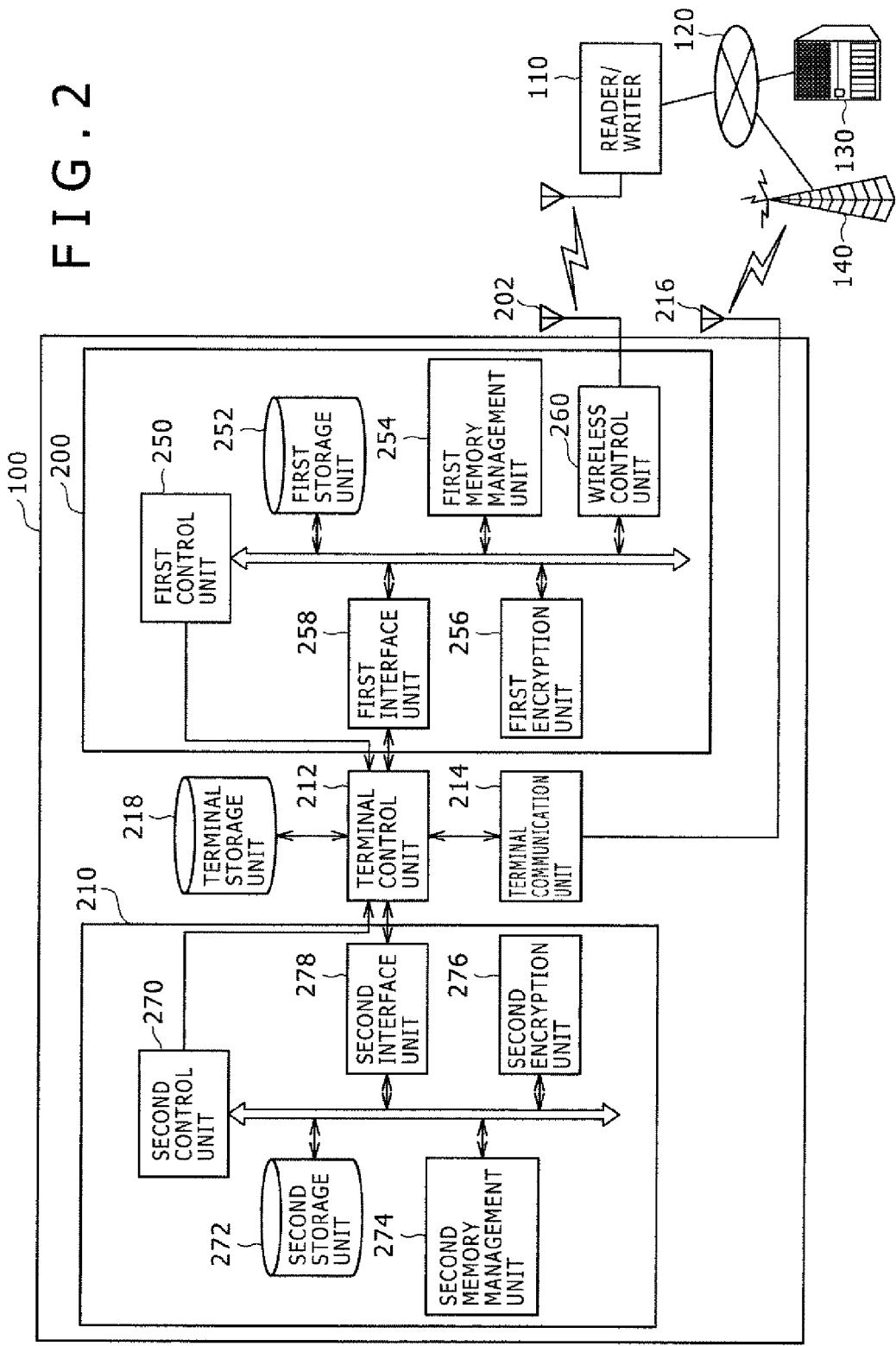
FIG. 2 is a function block diagram outlining the structure of the information processing terminal.

Preferred embodiments of the present invention will now be described with reference to the accompanying drawings. In the description that follows and in the attached drawings, like reference numerals designate like or corresponding components throughout and their descriptions are omitted where redundant.

Information processing terminal equipment supplemented with an IC card function generally includes an IC card control unit for executing that function apart from a terminal control unit that caries out arithmetic operations specific to the terminal. In order to maintain its reliability, the ID card control unit needs to operate independently of the terminal control unit. In view of its future functional expansion, the IC card control unit has to adopt a high-performance CPU and a large-capacity memory. That means every time the IC card function is activated, power is wasted on reserve capabilities far exceeding the current need.

When a hardware expansion of the IC card function becomes necessary, the currently mounted IC card chip need to be dismounted and discarded together with its still-usable components such as wireless communication circuits. While the IC card chip may be chosen from removable media such as SIM/UIM cards, the practice involves having recourse to media-specific interfaces which are slow to stare up and run and which can hamper smooth execution of certain applications.

An information processing terminal of an embodiment of the present invention uses a plurality of IC card chips each taking charge of part of the IC card capabilities that used to be carried out by a single IC card chip. Each of the IC card chips takes over execution of the applications suitable for the chip in question. Illustratively, a low-performance IC card chip performs basic applications while a high-performance IC card chip carries out expanded applications. It is assumed that the applications each include a program and the data accessed by that program for processing. What follows is a detailed description of the information processing terminal of an embodiment of the present invention.

(Data Communication System)

FIG. 1 is a schematic view explanatory of a data communication system including an information processing terminal of an embodiment of the present invention. This data communication system is composed of a mobile information processing terminal 100 carried around by a user and a reader/writer 110 that performs noncontact wireless communication with the information processing terminal 100 by sending a carrier wave to the terminal.

The information processing terminal 100 is typically a mobile phone, a PDA (personal digital assistant), a personal computer, or a mobile computer equipped with the IC card function in the form of an IC card chip arrangement. The information processing terminal 100 thus has two kinds of capabilities: those specific to an information processing terminal, and those unique to IC cards. Although the information processing terminal 100 will be described below as having IC card chips attached thereto or embedded therein, this is not limitative of the invention. Among other alternatives, IC card chips may be furnished separately and connected in wired fashion to the terminal upon use.

The IC card chip contained in the information processing terminal 100 may have its RF analog front end to execute the IC card function and logic circuits either in a single chip or divided into two or more chips depending on the way the invention is embodied.

The reader/writer 110 of this data communication system may be connected with a server 130 through a communication network 120, the server 130 providing applications to the reader writer 110. One such application may define the procedure for exchanging data between the reader/writer 110 and the IC card chips inside the information processing terminal 100.

The data communication system may adopt a short-range wireless technology known as NFC (Near Field Communication) technology involving the use of an RF carrier wave frequency of 13.56 MHz. According to this short-range wireless standard, noncontact tamperproof wireless communication takes place within a short range of above 10 centimeters. The user can visually recognize the reader/writer as the target of communication and thus can forestall leaks of information during the communication. The process of communication is plainly seen thanks to the user's hand action for data transfer.

With this data communication system, the user holds his or her information processing terminal 100 over the reader/writer 110 to receive various services offered by the reader/ writer 110. Generally, the reader/writer 110 continuously outputs a standardized carrier wave of the data communication system. An IC card chip in the information processing terminal 100 establishes communication channels with the reader/writer 110 by detecting the carrier wave coming therefrom.

If the information processing terminal 100 is arranged to function as the reader/writer 110, then the terminal 100 may be held over an IC card or the like. The information processing terminal 100 may then establish communication channels with the IC card by outputting a carrier wave from the information processing terminal 100.

(Information Processing Terminal 100)

FIG. 2 is a function block diagram outlining the structure of the information processing terminal 100. The information processing terminal 100 typically includes a first IC card chip 200, an IC antenna unit 202, a second IC card chip 210, a terminal control unit 212, a terminal communication unit 214, a terminal antenna unit 216, and a terminal storage unit 218. Although two IC card chips are shown in FIG. 2, this is not limitative of the present invention. Alternatively, many more IC card chips may be incorporated in the terminal 100.

The first IC card chip 200 is formed by semiconductor integrated circuits that function as an IC card. Data is exchanged in highly reliable fashion within the first IC card chip 200 that constitutes a tamperproof chip in signal manner. Two or more units of the first IC card chip 200 may alternatively be furnished inside the information processing terminal 100.

One of the objectives of the first IC card chip 200 is to deal with short-time processes to be done on the order of milliseconds. One such process involves completing communications with the reader/writer 100 as the user is passing through a station ticket gate. Given that prospect, the first IC card chip 200 should preferably be mounted integrally on the terminal rather than furnished as a removable medium that may not be capable of supplying power quickly enough or of executing direct controls efficiently enough. In a public transportation setup such as the ticket gate, quick response is generally demanded of applications. The processing load of such applications is alleviated and their response enhanced by the IC card chip 200 adopting DES cryptographic technology or the like for shorter response time.

The IC antenna unit 202 is an antenna for communicating with the reader/writer 110. As such, the IC antenna unit 202 converts an electrical signal coming from the first IC card chip 200 into a wireless radio wave signal and a wireless radio wave signal coming from the reader/writer 110 into an electrical signal. The length and the shape of the antenna are determined by the RF carrier wave frequency of NFC (e.g., 13.56 MHz).

The second IC card chip 210 is formed by semiconductor integrated circuits that function as another IC card. As with the first IC card chip 200, data is exchanged in a highly reliable manner inside the second IC card chip 210 that constitutes a tamperproof chip in single manner. The second IC card chip 210 provides higher performance than the first IC card chip 200 and can execute ponderous encryption processes (e.g., public key encryption). Two or more units of the second IC card chip 210 may alternatively be furnished inside the information processing terminal 100.

As described above, the first IC card chip 200 and second IC card chip 210 may be structured with different levels of performance. Generally, the processing load of an application is inversely proportional to its processing time. This embodiment has at least one IC card chip (e.g., first IC card chip 200) executing low-load applications at high speed on low voltage, and another IC card chip (e.g., second IC card chip 210) carrying out applications that are allowed to run slowly.

The terminal control unit 212 performs arithmetic operations other than those of the IC card function, such as wireless voice communication or wireless data communication, and controls data communication between the first IC card chip 200 and the second IC card chip 210. Because the terminal control unit 212 takes over the control of data communication between the first IC card chip 200 and the second IC card chip 210, these two card chips can concentrate their performance on the processing of selected applications and thereby shorten the overall processing time.

When the first IC card chip 200 initiates data sending to or receiving from the second IC card chip 210 or vice versa, the first IC card chip 200 and the second IC card chip 210 interrupt the terminal control unit 212 and request activation of a DMA (direct memory access) channel.

Inside the information processing terminal 100, the first IC card chip 200 and second IC card chip 210 are each formed as a secure domain. The terminal control unit 212 serves to support data sending alone by one of the two chips to the other.

The terminal communication unit 214 is used for wireless voice communication with a wireless communication station 140. In operation, the terminal communication unit 214 permits voice or data communication with another information processing terminal 100 by way of the wireless communication station 140 and communicating network 120.

The terminal antenna unit 216 is an antenna for communicating with the wireless communication station 140. In operation, the terminal antenna unit 216 converts an electrical signal coming from the terminal communication unit 214 into a wireless radio wave signal and a wireless radio wave signal coming from the wireless communication station 140 into an electrical signal.

The terminal storage unit 218 is composed of any one of such storage media as the RAM, EEPROM, nonvolatile RAM, flash memory, card memory, USB (Universal Serial Bus) memory, and HDD (hard disk drive). As such, the terminal storage unit 218 accommodates programs and data for use by the terminal control unit 212.

As described, the information processing terminal 100 has two IC card cards each taking over part of the divided IC card capabilities. Each IC card chip performs arithmetic operations suitable for the processing load of a given application. The applications to be utilized are each processed either by the first IC card chip 200 or by the second IC card chip 210 depending on the processing load involved in the data communication with the reader/writer 110.

The provider of a given application can designate either the first IC card chip 200 or the second IC card chip 210 as the preferred circuit to process the application in question. The designation may be accomplished in consideration of whether the application of interest is allowed to run slowly for undergoing ponderous processes such as encryption or is to be carried out as quickly as possible regardless of such consideration. This arrangement makes it possible for the terminal to carry out arithmetic operations suitable for the processing load of the application to be used.

(First IC Card Chip 200)

The first IC card chip 200 is made up of a first control unit 250, a first storage unit 252, a first memory management unit 254, a first encryption unit 256, a first interface unit 258, and a wireless control unit 250.

The first control unit 250 manages and controls the first IC card chip 200 as a whole using semiconductor integrated circuits including a central processing unit (CPU). The first control unit 250 is capable of singly executing low-load applications of which the processing load is below a predetermined threshold level, without intervention of the second IC card chip 210 and terminal control unit 212.

Because it need only deal with the low-load applications, the first control unit 250 may be equipped with a fast, power-thrifty CPU. This structure allows each of the low-load applications to be started and carried out rapidly and stably even when the supply of power is very limited.

Since the wireless control unit 260 (to be discussed later) is provided on the side of the first IC card chip 200, a data communication channel with the reader/writer 110 can be established in a short time by simply starting up the first IC card chip 200 from the sleep state (i.e., being switched off) without intervention of the second control unit 270 or terminal control unit 212. With applications diversifying in type and with their levels of sophistication ever-increasing, the information processing terminal 100 arranged to perform instantaneous processing can thus shorten the time it takes to process various applications.

The first IC card chip 200 can perform low-load applications on its own by receiving radio waves from the reader/writer 110 and deriving power from the received radio waves. The battery-less information processing terminal 100 starts up from its usually established sleep state by accumulating the supply of power received from the reader/writer 110 upon access from the latter.

With the above structure in place, the first IC card chip 200 carries out low-load applications by receiving infinitesimal power from an external apparatus such as the reader/writer 110 and thereby starts up from the sleep state of the information processing terminal 100. Because it can send and receive data using a minimum of power (on low voltage), the first IC card chip 200 can continue executing stable data communication under unstable circumstances where the supply of a certain level of power is difficult to obtain.

The first storage unit 252 connected to the first control unit 250 is formed by a nonvolatile memory such as an EEPROM, a nonvolatile RAM or a flash memory. In operation, the first storage unit 252 stores program data for use with the applications processed by the first control unit 250, as well as application data (user IDs, information about amounts and payments, etc.) The applications to be stored in the first storage unit 252 are low-load applications, i.e., applications of which the processing load is relatively low.

The first memory management unit (MMU) 254 manages the memory domain of the first storage unit 252. In operation, the first memory management unit 254 can indirectly reference the first storage unit 252 for the presence or absence of presumably stored data.

When the first control unit 250 creates data by executing an application, the first encryption unit 256 encrypts that part of the created data which is to be output the chip, i.e., the data to be output to the terminal control unit 212, second IC card chip 210, and reader/writer 110. Diverse kinds of encryption algorithms may be used for the encryption. In addition to the symmetrical key scheme and PKI (Public Key Infrastructure), this embodiment may utilize DES (Data Encryption Standard) and public key encryption, among others.

The first encryption unit 256 above permits secure communicating among the reader/writer 110, first IC card chip 200, and second IC card chip 210 independently of the terminal control unit 212. This arrangement establishes highly reliable communicating channels between a plurality of IC card chips, the level of security being as high as with a single IC card chip.

The first interface with 258 functions as a data buffer, relaying data between the first control unit 250 and the terminal control unit 212.

The wireless control unit 260 conducts noncontact wireless communication with the reader/writer 110. The wireless control unit 260 can exchange data with the reader/writer 110 by receiving the carrier wave therefrom and communicate data with an IC card by sending the carrier wave to the latter. Because the wireless control unit 260 permits secure data communication with the reader/writer 110 sending and receiving applications and data to and from that external apparatus in a secure and reliable manner, the applications to be processed by the first IC card chip 200 or second IC card chip 210 may also be added to or deleted from the first storage unit 252 or second storage unit 272 (to be discussed later) through the wireless control unit 260.

Information processing terminals 100 are generally subject to diverse modes of communication, so that their data input interfaces may or may not be structured securely. In such cases, it is possible to keep the applications to be handled by the first IC card chip 200 or by the second IC card chip 210 above a certain level of reliability when they are added or deleted through the wireless control unit 260 having established secure communication channels with the reader/writer 110.

(Second IC Card Chip 210)

The second IC card chip 210 is made up of a second control unit 270, a second storage unit 272, a second memory management unit 274, a second encryption unit 276, and a second interface unit 278.

The second control unit 270 manages and controls the second IC card chip 210 as a whole using semiconductor integrated circuits including a central processing unit (CPU). The second control unit 270 executes applications of which the processing load is above the predetermined threshold level, by way of the terminal control unit 212 and first IC card chip 200. It follows that the second control unit 270 can adopt a high-performance CPU operating on the power supplied by the information processing terminal 100.

The second storage unit 272 connected to the second control unit 270 is typically formed by a nonvolatile memory such as an EEPROM, a nonvolatile RAM or a flash memory. In operation, the second storage unit 272 stores program data for use with the applications processed by the second control unit 270, as well as application data (user IDs, information about amounts and payments, etc.) The applications to be stored in the second storage unit 272 are applications of which the processing load is relatively high.

The second memory management unit 274 manages the memory domain of the second storage unit 272. In operation, the second memory management unit 274 can indirectly reference the second storage unit 272 for the presence or absence of stored data. In particular, the second memory management unit 274 manages divided storage of applications involving high and low processing loads into the second storage unit 272 and first storage unit 252. Each application is specified beforehand for storage in a specific IC card chip. The second control unit 270 may receive a command from the terminal control unit 212 and may distribute applications to their designated IC card chips according to the chip ID and the setting of a load-complete flag for each application in the received command.

For example, suppose that all applications including low-load applications are currently stored in the second storage unit 272 and that the terminal control unit 212 issues to the second control unit 270 a load command designating the distribution of certain applications. In that case, the second control unit 270 transfers, the low-load applications from the second storage unit 272 into the first storage unit 252 in keeping with the load command.

Likewise, suppose that low-load applications are currently held in the first storage unit 252 and that the terminal control unit 212 issues to the second control unit 270 a save command designating the saving of the applications. In such a case, the second control unit 270 moves the low-load application from the first storage unit 252 into the second storage unit 272 in accordance with the save command. Load and save commands may be issued in such a manner as to transfer collectively all applications to be referenced into a desired IC card chip.

When a load command is used to transfer one application from the second storage unit 272 to the first storage unit 252, the same application in the second storage unit 272 would normally be deleted from there to prevent duplication of the application to be carried out. The load operation is usually followed by a save operation that would move the same application from the first storage unit 252 back to the second storage unit 272. The to-and-fro movement, if actually affected, would entail unnecessarily dissipated time and power. The waste is averted by performing an operation representative of the deletion than actually does not take place.

When a low-load application is loaded, the second control unit 270 does not delete the same low-load application from the second storage unit 272. Instead, the second control unit 270 disables the application in question in the second memory unit 274 by setting a load-complete flag corresponding to the application. When the same low-load application is saved, the corresponding load-complete flag is cleared so that the application may be again enabled in the second memory unit 274.

The load-complete flag arrangement is used to effect apparent loading of applications from the second storage unit 272 to the first storage unit 252 and apparent saving of the same applications in the reverse direction. Because the save command does not entail actual data transmission, processing time is shortened and power consumption reduced.

When the second control unit 276 creates data by executing an application, the second encryption unit 276 encrypts that part of the created data which is to be output the chip, i.e., the data to be output to the terminal control unit 212 and first IC card chip 200. Diverse kinds of encryption algorithms may be used for the encryption. In addition to the symmetrical key scheme and PKI, this embodiment may utilize DES and public key encryption, among others.

The second encryption unit 276 above permits secure communication between the first IC card chip 200 and the second IC card chip 210 independently of the terminal control unit 212. This arrangement establishes highly reliable communication channels between a plurality of IC card chips, the level of security being as high as with a single IC card chip.

The second interface unit 278 functions as a data buffer, relaying data between the second control unit 270 and the terminal control unit 212.

(Attachment and Removal of the Second IC Card Chip 210)

As described above, the information processing terminal 100 contains the first IC card chip 200 and second IC card chip 210. The first IC card chip 200 has the wireless control unit 260, and the second IC card chip 210 includes the second control unit 270 that offers high performance. The second IC card chip 210 functions as a so-called master and the first IC card chip 200 as a slave. The second IC card chip 210 acting as the master may be considered the core of the IC card function.

Where that second IC card chip 210 is removable attached to the information processing terminal 100, the terminal 100 becomes easier and more convenient to use than ever.

With this embodiment, the second IC card chip 210 is constituted illustratively as a removable medium such as a SIM/UIM card. This structure allows the IC card chip to be replaced easily in the event of hardware modifications such as one for expanding encryption capabilities. The IC card function may thus be expanded or reduced in scale depending on the desired mode of use.

The fact that the second IC card chip 210 is easy to replace eliminates the need for initially adopting a sophisticated IC card chip containing a high-performance second control unit 270 and a large-capacity second storage unit 272 anticipating future usages. This helps reduce the area for hardware implementation and result in cost savings.

With the second IC card chip 210 arranged to be detachable, it is possible to move from one information processing terminal 100 to another the IC card chip 210 together with the applications stored in its second storage unit 272. It is also possible for the user to carry around the second IC card chip 210 as a storage medium. Another possibility is the offering of services such as provision of a second IC card chip 210 with applications preinstalled inside.

The terminal control unit 212 may preferably save low-load applications from the first storage unit 252 into the second storage unit 272 when the second IC card chip 210 is detached from the information processing terminal 100, the terminal control unit 212 further loading the low-load applications from the second storage unit 272 into the first storage unit 252 after the second IC card chip 210 has been attached to the information processing terminal 100. These operations may preferably be carried out using the above-mentioned load command and save command.

Where the preferred structure above is in effect, all applications stored in the first storage unit 252 and the second storage unit 272 may be saved into the second IC card chip 210 for collective move to another terminal. The user may replace the existing information processing terminal 100 with a new terminal to which the second IC card chip 212 removed from the old terminal is attached. This allows the applications used until that time to be moved to the new terminal and utilized unchanged without complicated procedures or steps.

The second IC card chip 210 has no wireless control unit 260 as an interface with the reader/writer 110. That means the encryption function may be expanded or applications may be changed with no need to modify the currently mounted first IC card chip 200.

(Program)

The present invention also provides a program for use with the information processing terminal 100. If any of the applications stored in the first storage unit 252 is selected, then this program causes the first control unit 250 singly to perform data communication with the reader/writer 110 without intervention of the second IC card chip 210 and the terminal control unit 212. If any of the applications stored in the second storage unit 272 is selected, then the program causes the second control unit 270 to perform data communication with the reader/writer 110 through the first control unit 250.

(Typical Circuits Constituting the First IC Card Chip 200)

What follows is a description of a typical circuit structure of the first IC card chip 200.

Figure 3:
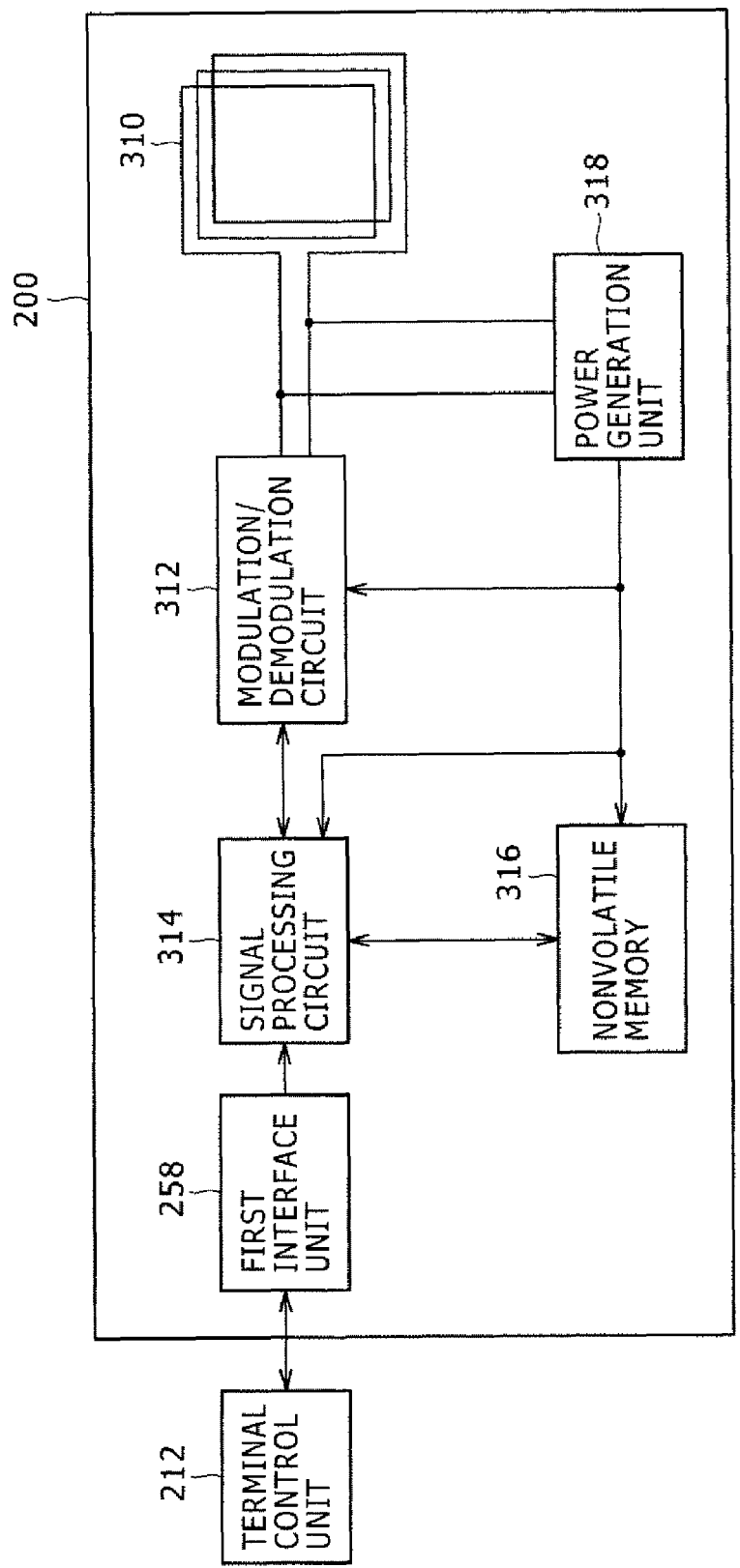
FIG. 3 is a circuit block diagram outlining the structure of a first IC card chip of the embodiment.

FIG. 3 is a circuit block diagram outlining the structure of the first IC card chip 200 as part of the information processing terminal 100 as an embodiment of the present invention. The first IC card chip 200 includes a loop antenna 310, a modulation/demodulation circuit 312, a signal processing circuit 314, a nonvolatile memory 316, a power generation unit 318, and the first interface unit 258. The first interface unit 258 was already discussed above and will be omitted from the ensuing description.

The loop antenna 310 is formed by a plurality of loops. An incorporated antenna in the IC card chip will suffice in place of the loop antenna 310 depending on the communication standard in effect or the frequency of the carrier wave in use.

The modulation/demodulation circuit 312 modulates the data to be sent to the reader/writer 110 in accordance with the standard of the data communication system and demodulates a modulated radio wave from the reader/writer 110 into data. More specifically, data is sent to the reader/writer 110 on a load switching basis. The load switching scheme involves varying the terminal-to-terminal load of the coil on the loop antenna 310 so as to let the resulting changes in the terminal-to-terminal impedance of the antenna as viewed from the reader/writer 110 be detected by the latter as transferred data. In this setup, the reader/writer 110 outputs its carrier wave while the information processing terminal 100 does not.

The signal processing circuit 314 is a semiconductor integrated circuit that processes signals while managing and controlling the first IC card chip 200 as a whole. The nonvolatile memory 316 having ROM and RAM capabilities retains its contents when power is switched off. That is, when the information processing terminal 100 has its data updated and is then turned off, the data is retained in the nonvolatile memory 316. The signal processing circuit 314 reads programs from the nonvolatile memory 316 and functions as the first memory management 254 and first encryption unit 256 based on the retrieved programs. The nonvolatile memory 316 acts as the first storage unit 252.

During communication with the reader/writer 110, the power generation unit 318 converts the radio wave (carrier wave) coming from the reader/writer 110 into power that is supplied to the modulation demodulation circuit 312, signal processing circuit 314, nonvolatile memory 316, and first interface unit 256. Because the power generation unit 318 needs to supply the circuits with power tapped from limited resources (i.e., radio wave), the circuits are each composed of an element that consumes as little power as possible.

(Operations of the Information Processing Terminal 100)

Specific operations of the information processing terminal 100 will now be described. What follows is a detailed description of the terminal workings under the following headings: 1. Initialization of the information processing terminal 100; 2. Examples of application execution by the information processing terminal 100; and 3. Addition and deletion of applications in the information processing terminal 100.

(1. Initialization of the Information Processing Terminal 100)

FIG. 4 is a flowchart of setup showing the flow of initialization of the information processing terminal 100. Initialization involves distributing applications to the respective chips. Of the applications kept in the second IC card chip 210, the low-load applications usable by the first IC card chip 200 are moved to the latter upon initialization.

The initialization above is performed when yet-to-be distributed low-load applications are found in the second storage unit 272. It follows that once the information processing terminal 100 is switched on and its applications are suitably distributed inside, there is no need for initialization from the next power-up onward.

When the user switches on the information processing terminal 100, the terminal control unit 212 reads from the terminal storage unit 218 a program unique to the terminal 100 and initializes the latter according to the retrieved program. During the initialization process, the first IC card chip 200 and the second IC card chip 210 are initialized and the applications destined for each of the chips are distributed to their destinations.

In step S400 (FIG. 4), the terminal control unit 212 sends to the second IC card chip 210 a load command for effecting an authentication process with the first IC card chip and for loading applications into the latter. Given the load command, the second control unit 270 of the second IC card chip 210 in step S402 references the second memory management unit 274 to determine whether the second storage unit 272 contains low-load applications usable by the first IC card chip 200, i.e., whether loading of the applications into the first IC chard chip 200 is demanded.

FIGS. 5A and 5B are diagrams explanatory of the contents of the second and the first memory management units. In the state of FIG. 5A where loading of applications (i.e., initialization) has yet to be complete, all applications A through D are present in the second storage unit 272 and registered in the second memory management unit 274. A chip ID is an identifier that identifies the first IC card chip to which to transfer relevant applications using a load command. A load-complete flag is a flag that indicates whether the application corresponding to the flag has been loaded yet. The application of interest has yet to be loaded if its load-complete flag remains "cleared," and is regarded as loaded into the appropriate IC card chip if its load-complete flag is "set."

A reference to the contents of the second memory management unit 274 in FIG. 5A indicates illustratively that the applications A and C are destined to be loaded (i.e., low-load applications), that the destination to which to transfer the applications is identified by the chip ID "1," and that loading (transfer) has yet to be effected. It is also indicated that the application B is to be processed by this second IC card chip 210 and that transfer of the application B is disabled by the corresponding load-complete flag being cleared. Although the chip ID is represented by a single digit numeral in this example, this is not limitative of the invention. The chip ID may alternatively be formed by a sequence of alphanumeric characters.

Because the loading of applications has yet to take place, there is no application found in the second storage unit 272 of the first IC card chip 200. The first memory management unit 254 currently has no information stored inside.

Returning to the flowchart of FIG. 4, the second IC card chip 210 in step S402 checks to determine whether the loading of applications is demanded. If there is found no such need in step S402, the initialization process is ended in step S404. If any low-load applications to be transferred are found, then an initialization command is generated in step S406. In step S408, an interrupt request is issued to the terminal control unit 212 in order to send the initialization command to the first IC card chip 200.

Given the interrupt request from the second control unit 270, the terminal control unit 212 activates its DMA channel and thereby allows the generated initialization command to be transferred from the second control unit 270 to the first control unit 250 in step S410.

In step S420, the first control unit 250 of the first IC card chip 200 chicks to determine whether the first storage unit 252 has a free area wide enough to accommodate the low-load applications, i.e., whether the loading of applications is possible. If the loading is not found possible, then the initialization process is terminated in step S422. If the loading is found possible in step S420, then the first control unit 250 generates a response in step S424. In step S426, the first control unit 250 issues an interrupt request to the terminal control unit 212 in order to send the response to the second IC card chip 210.

Upon receipt of the interrupt request from the first control unit 250, the terminal control unit 212 activates the DMA channel and thereby allows the generated response to be transferred from the first control unit 250 to the second control unit 270 in step S428.

In step S430, the second control unit 270 causes the second encryption unit 276 to generate an authentication challenge based on the encryption key (e.g., symmetrical key) stored in the second storage unit 272 and/or on the chip ID of the second IC card chip 210 and to issued the generated authentication challenge to the first control unit 250. Given the authentication challenge from the second control unit 270, the first control unit 250 causes the first encryption unit 256 to generate an authentication response based on the encryption key stored in the first storage unit 252 and/or on the chip ID of the first IC card chip 200 and to return the generated authentication response to the second control unit 270 in step S432. This completes mutual authentication between the first control unit 250 and the second control unit 270.

Following the mutual authentication, the second control unit 270 analyzes the chip ID from the response sent by the first control unit 250, recognizes the first IC card chip 200 to which to send applications, and transfers the low-load applications to the first control unit 250 of the first IC card chip 200 in step S440. To reflect the resulting change in application status, the first storage unit 252 and second storage unit 272 update the contents of the first memory management unit 254 and second memory management unit 274 respectively in step S442. Following the application transfer, the contents of the memory management units are changed from what is shown in FIG. 5A to what is listed in FIG. 5B. The load-complete flags are all shown "set" in the second memory management unit 274. When their load-complete flags are set, the applications A and C are still resident in the second storage unit 272 but they are now disabled.

In the above-described initialization process of the information processing terminal 100, the low-load applications were shown transferred from the second IC card chip 210 to the first IC card chip 200. Alternatively, it will be obvious to those skilled in the art that with the first IC card chip 200 acting as the core, applications can be transferred in the reverse direction from the first IC card chip 200 to the second IC card chip 210.

(2. Examples of Application Execution by the Information Processing Terminal 100)

Figure 6:
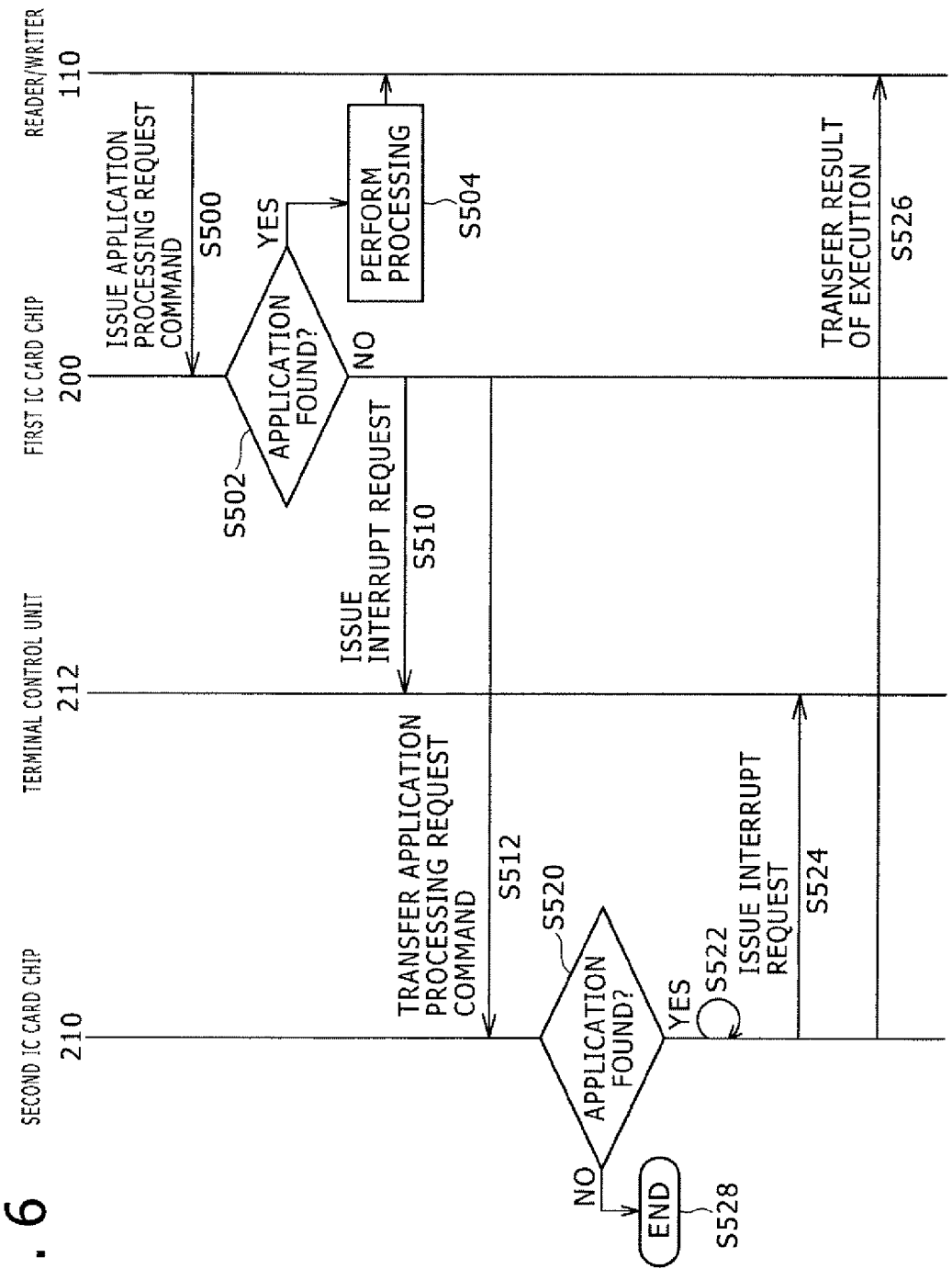
FIG. 6 is a flowchart of steps in which the information processing terminal of the embodiment is actually used.
Figure 7:
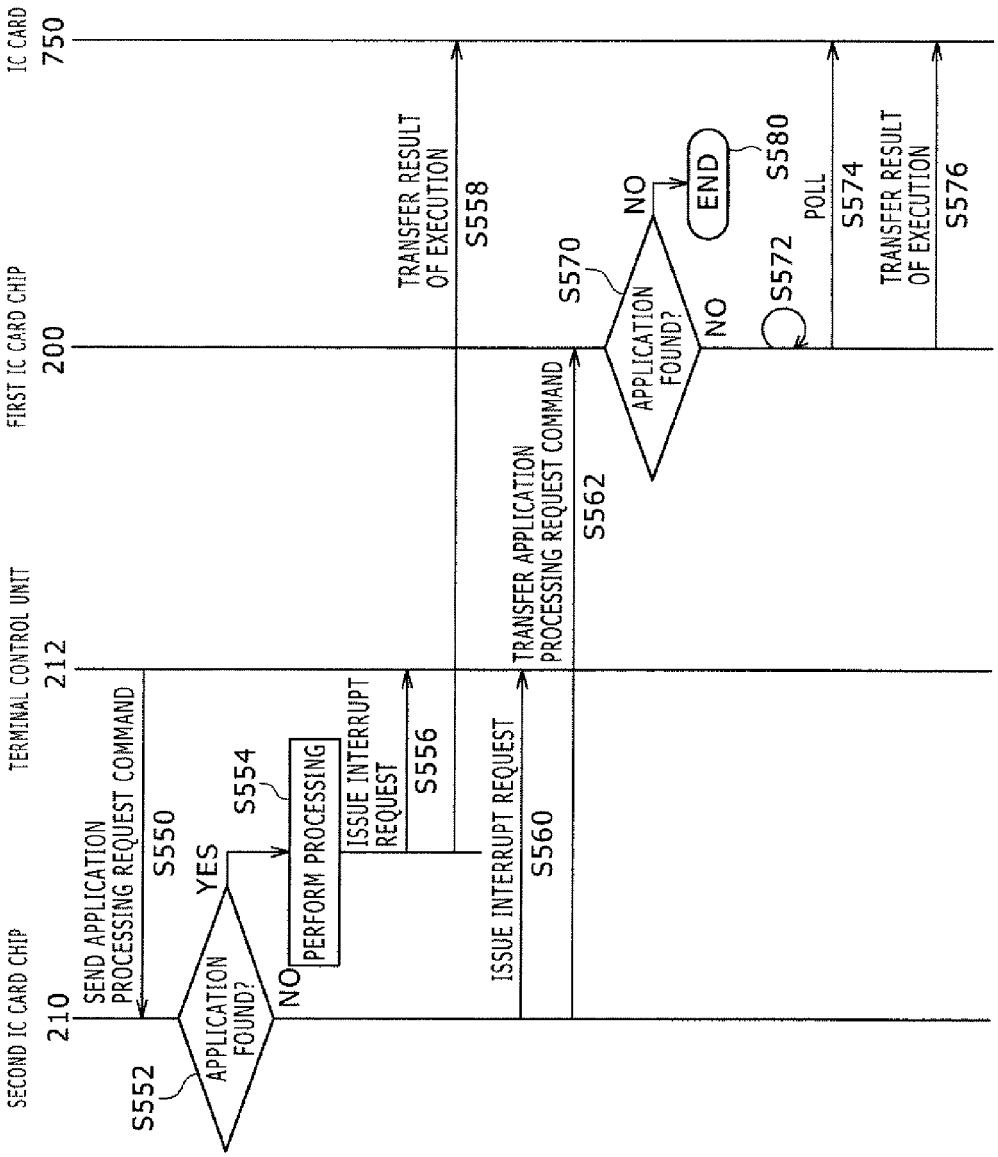
FIG. 7 is a flowchart of other steps in which the information processing terminal of the embodiment is actually used.

FIGS. 6 and 7 are flowcharts of steps in which the information processing terminal 100 of the embodiment is actually used. FIG. 6 shows the steps performed with emphasis on the reader/writer 110, and FIG. 7 gives the steps carried out with emphasis on the information processing terminal 100. The procedures of the steps vary depending on which of the first IC card chip 200 and the second IC card chip 210 retains the application about to be performed.

When the use holds by hand the information processing terminal 100 over the reader/writer 110, the reader/writer 110 in step S500 requests the wireless control unit 260 of the first IC card chip 200 to process a particular application corresponding to the application possessed by the reader/writer 110. In step S502, the first control unit 250 references the first memory management unit 254 to determine whether the application designated by the reader/writer 110 exists in the first storage unit 252.

If the designated application is found in the first storage unit 252 under its control, the first control unit 250 processes the application in question alone without starting up the terminal control unit 212 or the second IC card chip 210 in step S504. That means the first control unit 250 can respond quickly if the application designated by the reader/writer 100 is found in the first IC card chip 200.

If in step S502 the designated application is not found in the first storage unit 252, then the first control unit 250 issues an interrupt request in step S510 to the terminal control unit 212 in order to transfer control to the second IC card chip 210. Upon receipt of the interrupt request, the terminal control unit 212 activates the DMA channel, connects the first control unit 250 with the second control unit 270, and transfers from the first control unit 250 to the second control unit 270 a command to request processing of the designated application in step S512.

In step S520, the second control unit 270 of the second IC card chip 210, like the first control unit 250, references the second memory management unit 274 to see if the application designated by the reader/writer 110 exists in the second storage unit 272. If the designated application is found in the second storage unit 272 under its control, the second control unit 270 goes to step S522. The second control unit 270 in step S522 starts executing the application in question in the second IC card chip 210, and issues an interrupt request to the terminal control unit 212 in step S524.

In step S526, the second control unit 270 transfers the result of the application execution to the reader/writer 110 by way of the first control unit 250. If the designated application is not found, then the second control unit 270 in step S528 ignores the access attempt by the reader/writer 110 or transmits the terminal control unit 212 that the requested application could not be executed.

How the information processing terminal 100 in particular works in described below by referring to FIG. 7.

When the use operates the information processing terminal 100 in an attempt to use a desired resident application inside, the terminal control unit 212 in S550 sends an application processing request command to the second IC card chip 210 requesting execution of the application in question. Upon receipt of the application processing request command, the second control unit 270 of the second IC card chip 210 references the second memory management unit 274 in step S552 to determine whether the user-designated application exists in the second storage unit 272.

If the designated application is found in the second storage unit 272 under its control, the second control unit 270 starts processing the application in the second IC card chip 210 in step S554, and issues and interrupt request to the terminal control unit 212 in step S556. In step S558, the second control unit 270 transfers the result of the application execution to the reader/writer 110 by way of the first control unit 250.

If in step S552 the application is not found in the second storage unit 272, then the second control unit 270 issues an interrupt request to the terminal control unit 212 in step S560 so as to transfer control to the first IC card chip 200. Upon receipt of the interrupt request, the terminal control unit 212 activates the DMA channel, connects the second control unit 270 with the first control unit 250, and transfer from the second control unit 270 to the first control unit 250 a command to request processing of the designated application in step S562.

In step S570, the first control unit 250 of the first IC card chip 200, like the second control unit 270, references the first memory management unit 254 to see if the user-designated application exists in the first storage unit 252. If the designated application is found in the first storage unit 252 under its control, the first control unit 250 goes to step S572. The first control unit 250 in step S572 starts executing the application in question in the first IC card chip 200. Using the carrier wave from the wireless control unit 260, the first control unit 250 polls the target such as an IC card 750 for authentication and establishes data communication channels with that external IC card 750 in step S574. In step S576, the first control unit 250 transfers the result of the application execution to the reader/writer 110.

If the application is not found, the process is terminated in step S580. The user is informed that the requested application could not be processed.

(3. Addition and Deletion of Applications in the Information Processing Terminal 100)

FIGS. 8 and 9 are flowcharts of steps in which applications are added or deleted in the information processing terminal 100. FIG. 8 shows the steps performed with emphasis on the reader/writer 110 for adding or deleting applications to or from the second IC card chip 210, and FIG. 9 shows the steps carried out with emphasis on the information processing terminal 100 for adding or deleting applications to or from the second IC card chip 210. Such addition or deletion of applications is sent and received through secure data exchanges via the wireless control unit 260 of the first IC card chip; other communication channels of the information processing terminal 100 are not employed.

When the user holds by hand the information processing terminal 100 over the reader/writer 110, the reader/writer 110 in step S600 sends to the wireless control unit 260 of the first IC card chip 200 a command to request addition of a particular application on the basis of the application possessed by the reader/writer 110. In step S602, the first control unit 250 recognizes the application addition request command and issues an interrupt request to the terminal control unit 212 requesting that the designated application be added. Upon receipt of the interrupt request, the terminal control unit 212 activates the DMA channel and connects the first control unit 250 with the second control unit 270.

In step S610, the first control unit 250 causes the first encryption unit 256 to generate an authentication challenge based on the encryption key stored in the first storage unit 252 and/or on the chip ID of the first IC card chip 200 and to issue the generated authentication challenge to the second control unit 270. Given the authentication challenge from the first control unit 250, the second control unit 270 causes the second encryption unit 276 to generate an authentication response based on the encryption key sorted in the second storage unit 272 and/or on the chip ID of the second IC card chip 210 and to return the generated authentication response to the first control unit 250 in step S612. This completes mutual authentication between the first control unit 250 and the second control unit 270.

Following the mutual authentication, the second control unit 270 in step S620 signals its readiness to accept applications to the reader/write 110 through the first control unit 250. In step S622, the reader/writer 110 transfers the application in question to the second control unit 270. In step S624, the second control unit 270 stores the transferred application into the second storage unit 272 and updates the contents of the second memory management unit 274 in a manner reflecting the change in application status. If the application in question is a low-load application, the application is transferred to the first storage unit 252 at this point or next time power is applied for initialization.

The foregoing explanation was about the addition of applications. Deletion of applications can also be accomplished in a sequence of steps similar to what was discussed above.

What follows is a description, in reference to FIG. 9, of the steps carried out with emphasis on the information processing terminal 100 for adding or deleting applications to or from the second IC card chip 210. It is assumed here that the wireless control unit 260 of the first IC card chip 210 has reader/writer capabilities and is capable of outputting its own carrier wave. The first IC card chip 200 thus takes the lead in accessing an electronic apparatus (assumed here to be an IC card) having typical IC card capabilities.

The users operate the information processing terminal 100 to issue an application addition request. In response to the user's operation, the terminal control unit 212 sends an application addition request command to the second IC card chip 210 in step S700. Upon receipt of the application addition request command, the second control unit 270 of the second IC card chip 210 causes the second encryption unit 276 to generate an authentication challenge based on the encryption key stored in the second storage unit 272 in step S702. In step S704, the second control unit 270 issues an interrupt request to the terminal control unit 212 in order to add an application to the first IC card chip 200.

Given the interrupt request from the second control unit 270, the terminal control unit 212 activates the DMA channel and transfers the generated authentication challenge from the second control unit 270 to the first control unit 250 in step S710. Upon receipt of the authentication challenge from the second control unit 270, the first control unit 250 causes the first encryption unit 256 to generate an authentication response based on the encryption key stored in the first storage unit 252 and/or on the chip ID of the first IC card chip 200 and to return the generated authentication response to the second control unit 270 in step S712. This completes mutual authentication between the first control unit 250 and the second control unit 270.

In step S270, using the carrier wave from the wireless control unit 260, the first control unit 250 polls the target such as an IC card 750 for authentication and establishes data communication channels with that external IC card 750 in step S720. In step S722, the first control unit 250 effects an authentication process with the external IC card and requests the application to be added therefrom. With the application acquired from the external IC card, the first control unit 250 transfers the acquired application to the second control unit 270 in step S724. In step S726, the second control unit 270 stores the application in question into the second storage unit 272 and updates the contents of the second memory management unit 274 in a manner reflecting the change in application status.

The foregoing description was also about the addition of applications. As with the steps in FIG. 8, deletion of applications can be accomplished in a sequence of steps similar to what was discussed above.

The information processing terminal 100, as described above, enables applications to be carried out in a manner commensurate with the performance of each of the incorporated control units while maintaining an elevated level of security. The structure allows the information processing terminal 100 to effect smooth and secure data communication with the reader/writer 110 in power-thrifty manner.

Where the second IC card chip 210 is composed of any one of suitable removable media, it is easy to replace the chip or to expand its capabilities as demanded. The area demanded for hardware implementation is reduced because there is no need to anticipate future usages by mounting in a advance a large-capacity high-performance IC card chip on the information processing terminal 110. Furthermore, when the user replaces the existing information processing terminal 100 with another terminal, the applications utilized so far can be easily moved into the second IC card chip 210 that is simply exported to the new terminal for continuous use of the familiar applications.

It is to be understood that while the invention has been described in conjunction with a specific embodiment with reference to the accompanying drawings, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

For example, although the first and the second control units of the embodiment above were shown to effect data communication by way of the terminal control unit, this is not limitative of the invention. Alternatively, the first and the second control units may communicate data directly with each other.

In the foregoing description, the applications for use by the information processing terminal were shown placed in the second storage unit before being distributed to the first storage unit. Alternatively, the terminal control unit may directly distribute the applications to the first and the second storage units. As another alternative, the applications may be stored in the first storage unit before being distributed to the second storage unit.

It should also be noted that in this specification, the steps representative of the workings of the inventive information processing terminal may not denote solely the processes that are to be carried out in the depicted sequence in the flowcharts (i.e., on a time series basis); the steps may also denote processes that are conducted parallelly or individually (e.g., in parallel or object-oriented fashion).

It should be understood by those skilled in the art that various modifications, combination, sub-combinations and alterations may occur depending on design requirements and other factors insofar as they are within the scope of the appended claims or the equivalents thereof.

What is claimed is:

1. An information processing terminal comprising:
a first IC card chip constituted by a first control unit, a first storage unit configured to store applications to be processed by said first control unit, a first encryption unit configured to encrypt data created by any of the applications in said first storage unit before outputting the created data outside the chip, and a wireless control unit configured to permit noncontact wireless communication with a reader/writer;
a second IC card chip constituted by a second control unit, a second storage unit configured to store applications to be processed by said second control unit, and a second encryption unit configured to encrypt data created by any of the applications in said second storage unit before outputting the created data outside the chip;
a terminal control unit configured to control data communication between said first IC card chip and said second IC card chip;
wherein said first control unit is configured to only execute low-load applications of which a processing load involved in data communication with said reader/writer is less than a predetermined level, without intervention of said second IC card chip and said terminal control unit, and said second control unit is configured to execute only applications of which the processing load is above the predetermined level, and
wherein low-load applications are loaded from said second storage unit into said first storage unit in accordance with a load command issued by said terminal control unit.

2. The information processing terminal according to claim 1, wherein any of said applications is processed by either said first IC card chip or by said second IC card chip in accordance with the processing load.

3. The information processing terminal according to claim 2, wherein said first IC card chip is capable of singly executing said low-load applications using energy derived from radio waves received from said reader/writer.

4. The information processing terminal according to claim 1, wherein said low-load applications are saved from said first storage unit into said second storage unit in accordance with a save command issued by said terminal control unit.

5. The information processing terminal according to claim 4, wherein each of said low-load applications in said second storage unit is not deleted but disabled by setting a load-complete flag when the low-load application in question is loaded, said low-load application being again enabled by clearing said load-complete flag when said low-load application is saved.

6. The information processing terminal according to claim 1, wherein said second IC card chip is removably attached to said information processing terminal.

7. The information processing terminal according to claim 6, wherein said terminal control unit saves low-load applications from said first storage unit into said second storage when said second IC card is detached from said information processing terminal, said terminal control unit further loading said low-load applications from said second storage unit into said first storage unit after said second IC card chip has been attached to said information processing terminal.

8. The information processing terminal according to claim 1, wherein the applications to be processed either by said first IC card chip or by said second IC card chip are either added to or deleted from any of said first storage unit and said second storage unit through said wireless control unit.

9. An information processing terminal comprising:
a first IC card chip constituted by a first control unit, a first storage unit configured to store applications to be processed by said first control unit, a first encryption unit configured to encrypt data created by any of the applications in said first storage unit before outputting the created data outside the chip, and a wireless control unit configured to permit noncontact wireless communication with a reader/writer;
a second IC card chip constituted by a second control unit, a second storage unit configured to store applications to be processed by said second control unit, and a second encryption unit configured to encrypt data created by any of the applications in said second storage unit before outputting the created data outside the chip;
a terminal control unit configured to control data communication between said first IC card chip and said second IC card chip, wherein low-load applications are loaded from said second storage unit into said first storage unit in accordance with a load command issued by said terminal control unit; and
wherein said first control unit is configured to only execute low-load applications of which a processing load involved in data communication with said reader/writer is less than a predetermined level, without intervention of said second IC card chip and said terminal control unit, and said second control unit is configured to execute only applications of which the processing load is above the predetermined level, and
a memory storing computer instructions which, when executed by said terminal control unit, cause said terminal control unit to perform a method comprising:

loading low-load applications from said second storage unit into said first storage unit in accordance with a load command issued by said terminal control unit, causing said first control unit to singly perform data communication with said reader/writer through said wireless control unit without intervention of said second IC card chip and said terminal control unit when any of the applications stored in said first storage unit are selected, and causing second control unit to perform data communication with said reader/writer through said first control unit when any of the applications stored in said second storage unit are selected.

* * * * *